Nov. 5, 1929.  W. BEUSCH  1,734,109
WATTLESS COMPONENT METER
Filed Dec. 16, 1925
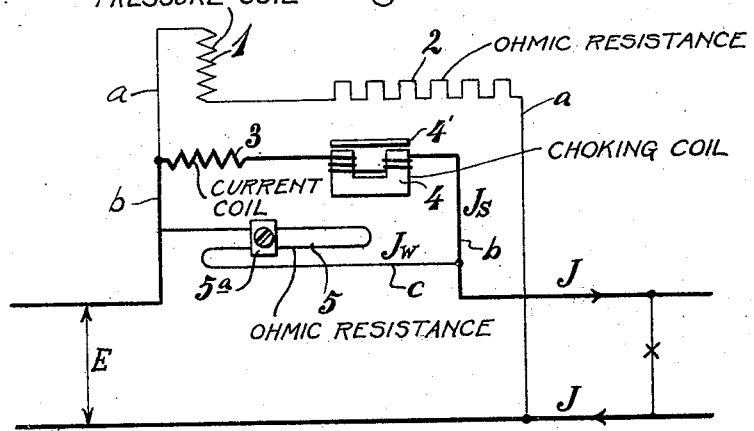
DIAGRAM of METER ARRANGEMENT
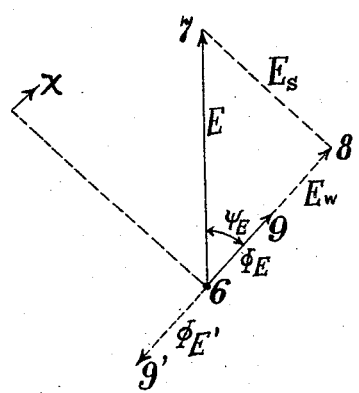
MAGNETIC PRESSURE CIRCUIT
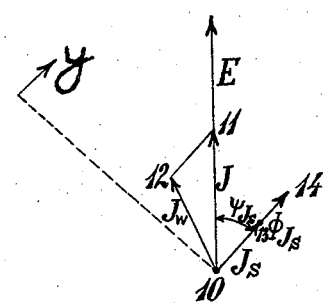
MAGNETIC CURRENT CIRCUIT
Inventor:
W. Beusch
By John D. Morgan
Attorney Patented Nov. 5, 1929

1,734,109

UNITED STATES PATENT OFFICE

WILLI BEUSCH, OF ZUG, SWITZERLAND, ASSIGNOR TO LANDIS & GYR, A.-G., OF ZUG, SWITZERLAND, A LIMITED JOINT-STOCK COMPANY OF SWITZERLAND

WATTLESS COMPONENT METER

Application filed December 16, 1925, Serial No. 75,704, and in Switzerland December 24, 1924.

The invention relates to an induction meter, and more particularly to a novel and useful meter for accurately measuring alternating currents of widely different frequencies, and especially adaptable to accurately measure the wattless component of very low frequency currents.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a diagrammatic representation of the essential elements of a meter embodying my invention;

Fig. 2 is a vector diagram of the pressure magnetic circuit; and

Fig. 3 is a vector diagram of the current magnetic circuit.

My invention provides a wattless component meter on the induction principle which accurately measures not only current of the customary frequencies of lighting circuits of say (40, 50 or 60 cycles) but which is also especially adapted to accurately measure currents of relatively low frequencies, such as are used in railway and industrial work (say $13\frac{1}{2}$, $16\frac{2}{3}$ or 25 cycles), although it will be understood that such frequencies are not restrictive of the invention.

My invention provides also a means for current control whereby accurate determinations of the kind indicated are rendered possible despite the influences due to variations in operating conditions, such as variations of load, power factor, voltage, frequency or other causes.

In induction type wattless component meters at unity power factor the pressure field is in phase opposition to the active series field irrespective of whether the active pressure field is in phase with the pressure producing it, or not. In the meter of my present invention, there is an angle of lag of between 0° and 90° between the pressure field and the applied pressure producing it. The active current field accordingly has to be displaced from the main current, so that it is at unity power factor in phase opposition with the pressure field.

The following description of the corresponding construction of a single phase meter, and its vector diagrams, explain how this is obtained.

Referring now in detail to the embodiment of my invention diagrammatically illustrated by way of example in the accompanying drawings, the pressure circuit is indicated by $a$. In pressure circuit $a$ is the pressure coil 1 and in series therewith is an ohmic resistance 2. The current circuit $b$ has a current coil or coils 3 therein, and in series therewith is a choking coil 4, which has means 4' of any known or suitable form for varying the choking effect. In parallel with the current coil 3 and choking coil 4 is a circuit $c$ having an ohmic resistance 5, having means 5ª of any known or suitable form for varying the ohmic resistance. The choking coil 4 and the ohmic resistance 5 are variable or regulable either independently or together, as may be found necessary or desirable.

Fig. 2 is a vector diagram of the pressure magnetic circuit. The vector 6, 7 represents the supply voltage E. $E_s$ represents the voltage in pressure coil 1 (Fig. 1) and $E_w$ the voltage in ohmic resistance 2. Vector 6, 9 represents the magnitude of the active pressure flux $\Phi$ E.

Fig. 3 is a vector diagram of the current magnetic circuit at unity power factor. The supply current J is divided into two parts, $J_s$ 10—13 and $J_w$ 10—12. $J_s$ passes through the current coil 3 and the choking coil 4 (Fig. 1). $J_w$, as shown by vector 10—12 in Fig. 3, is leading the supply current J, causing $J_s$, and consequently $\Phi J_s$, to lag behind the current J. It is necessary that the phase angle $\Psi_E$ of the motive pressure field and the pressure E, (Fig. 2) be equal to $\Psi_{Js}$ (Fig. 3). This can be effected by adjustment of resistance 5, and choking coil 4 (Fig. 1). The two active magnetic fluxes $\Phi_E$ and $\Phi J_s$ combine substantially as indicated in these diagrams. $x$ and $y$ in Figs. 2 and 3, respectively, indicate the direction of rotation of the fields of the respective circuits.

In an induction type watt-hour meter the torque D is proportional to $$\Phi_E \cdot \Phi J \cdot \sin(90° - \phi) = \Phi_E \cdot \Phi J \cdot \cos \phi,$$

and it is common knowledge, that the angle of lag of the motive pressure and current fields is 90° at cos $\phi=1$. In a wattless component meter at cos $\phi=1$, if the torque is to act in the same direction for a phase angle between 0° and 180°, as it does between 0° and 90° in the watt-hour meter, the angle of lag between the motive pressure and current fields must be 180°, as only then does $$D \text{ (the torque)} = \Phi_E \cdot \Phi J \cdot \sin(180° - \phi)$$

positive, or $$D = \Phi_E \cdot \Phi J \cdot \sin \phi.$$

The explanation just given shows that the vector of the active pressure field $\Phi_E$ (Fig. 2) has to be brought into the position of vector $\Phi_E' = 6 - 9'$. This is effected by reversing the connections of the voltage coil.

Extensive tests have shown that the described meter has very excellent performance characteristics, not only at load and power factor variations of the supply circuit, but it is also extremely independent of variations of voltage, frequency and temperature.

It will be understood that the disclosed embodiment of the invention as applied to a wattless component meter is illustrative but not restrictive of the invention.

From all the foregoing it will be understood that a meter mechanism has been provided for accurately measuring the wattless component; and it will be further understood that variations and departures may be made in and from the precise manner of carrying out and embodying the invention herein illustratively set forth without departing from the principles of the invention and without sacrificing its chief advantages.

What I claim is:—

1. A wattless component induction meter including in combination a current coil, a choking coil in series with the current coil, and an ohmic resistance in parallel with the current coil and choking coil.

2. A wattless component induction meter including in combination a current coil, a choking coil in series with the current coil, and an ohmic resistance in parallel with the current coil and choking coil, and means for varying the choking effect of the choking coil.

3. A wattless component induction meter including in combination a current coil, a choking coil in series with the current coil, and an ohmic resistance in parallel with the current coil and choking coil, and means for varying said ohmic resistance.

4. A wattless component induction meter including in combination a current coil, a choking coil in series with the current coil, an ohmic resistance in parallel with the current coil and choking coil, means for varying the choking effect of the choking coil, and means for varying said ohmic resistance.

5. A wattless component induction meter including in combination a pressure coil and circuit, a current coil, a choking coil in series with the current coil, means for varying the choking effect of the choking coil, and an ohmic resistance in parallel with the current coil and choking coil.

6. A wattless component induction meter including in combination a pressure coil and circuit, a current coil, a choking coil in series with the current coil, and an ohmic resistance in parallel with the current coil and choking coil.

7. A wattless component induction meter including in combination a pressure coil and circuit, an ohmic resistance in the pressure circuit, a current coil, a choking coil in series with the current coil, and an ohmic resistance in parallel with the current coil and choking coil.

In testimony whereof, I have signed my name to this specification.

WILLI BEUSCH.